United States Patent
Wen et al.

(10) Patent No.: US 7,652,976 B2
(45) Date of Patent: Jan. 26, 2010

(54) METHOD FOR ESTIMATING AND COMPENSATING IQ IMBALANCE IN OFDM SYSTEMS

(75) Inventors: Chao-Kai Wen, Taipei (TW); Jiun-Yo Lai, Taichung (TW); Yu-Tao Hsieh, Hsinchu (TW); Pang-An Ting, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 354 days.

(21) Appl. No.: 11/797,723

(22) Filed: May 7, 2007

(65) Prior Publication Data

US 2008/0279221 A1    Nov. 13, 2008

(51) Int. Cl.
    *H04J 11/00*    (2006.01)
(52) U.S. Cl. .................. 370/203; 370/332; 375/343
(58) Field of Classification Search ......... 370/203–208, 370/332, 338; 375/346–347, 285, 296
See application file for complete search history.

(56) References Cited

U.S. PATENT DOCUMENTS

| | | | |
|---|---|---|---|
| 6,108,353 A * | 8/2000 | Nakamura et al. ......... 370/504 |
| 7,167,513 B2 * | 1/2007 | Tsui et al. .................. 375/229 |
| 7,251,291 B1 * | 7/2007 | Dubuc et al. ............... 375/296 |
| 2005/0152476 A1 * | 7/2005 | Coersmeier ................ 375/322 |
| 2005/0152482 A1 | 7/2005 | Tubbax et al. |
| 2005/0190848 A1 * | 9/2005 | Kiyanagii et al. .......... 375/260 |
| 2005/0276354 A1 | 12/2005 | Su et al. |
| 2006/0029150 A1 | 2/2006 | Capozio |
| 2007/0263667 A1 * | 11/2007 | Dubuc et al. ............... 370/500 |
| 2008/0273608 A1 * | 11/2008 | Jonsson ..................... 375/260 |

OTHER PUBLICATIONS

Tarighat et al. "Compensation Schemes and Performance Analysis of IQ Imbalances in OFDM Receivers", IEEE Transactions on Signal Processing, vol. 53, No. 8, Aug. 2005, pp. 3257-3268.

* cited by examiner

*Primary Examiner*—William Trost, IV
*Assistant Examiner*—Roberta A Shand
(74) *Attorney, Agent, or Firm*—Birch, Stewart, Kolasch & Birch, LLP (57) ABSTRACT

A method for compensating IQ imbalance is disclosed. First, an OFDM signal is received. The OFDM signal is translated into frequency domain, wherein the translated OFDM signal has N sub-carriers noted as Y(1)-Y(N). The IQ imbalance compensation factor is generated according to the k-th sub-carrier of the translated signal Y(k), the (N−k+2)-th sub-carrier of the translated signal Y(N−k+2), and the complex conjugates thereof.

29 Claims, 8 Drawing Sheets

METHOD FOR ESTIMATING AND COMPENSATING IQ IMBALANCE IN OFDM SYSTEMS

BACKGROUND OF THE INVENTION

Field of the Invention

The invention relates to radio communication, and, more particularly, to a frequency division multiplexing (FDM) communication systems.

Orthogonal frequency division multiplexing (OFDM)-based physical layers have been selected for several wireless standards such as IEEE 802.11, IEEE 802.16, and IEEE 802.20. A low-cost physical layer implementation thereof is challenging under impairments associated with analog components. Among the analog components, down-conversion is one of the fundamental stages in radio-frequency (RF) front-end architectures. The down-conversion serves as a device to transfer the high carrier frequency signal to intermediate frequencies appropriate for further amplification and processing and, eventually, to the zero frequency (baseband). There are different architectures for converting the RF signal to the baseband, either through an intermediate frequency (IF) or by direct down-conversion to a baseband signal (zero intermediate frequency). There are advantages and disadvantages associated with each one. Due to certain advantages (e.g., cost, area, power consumption, and less off-chip components) in direct conversion, many future RF designs are adopting this scheme. However, a problem with direct conversion receivers when compared to other receivers is that the baseband signals are more severely distorted by imbalances within the I and Q branches.

Figure 1:
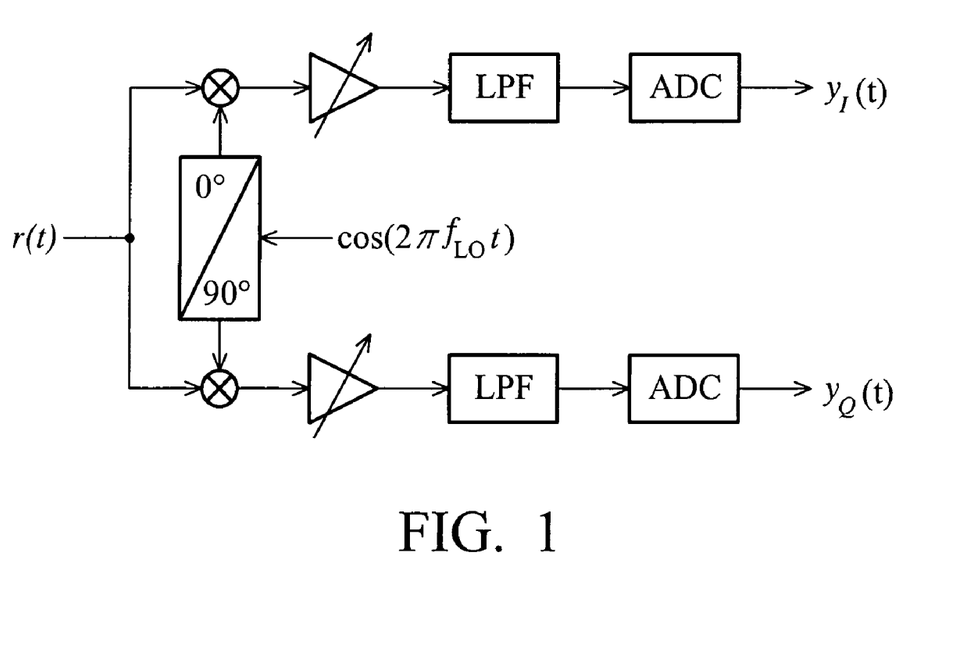
FIG. 1 shows a block diagram of down-converting an RF signal into I and Q branches.

The down-conversion of RF signals to the baseband through either direct conversion or heterodyne architectures is implemented by complex down-conversion. FIG. 1 shows a block diagram of down-converting an RF signal into I and Q branches. The complex down-converter basically multiplies the RF signals by the complex waveform $e^{-j2\pi f_{LO}t}$, where $f_{LO}$ is the local oscillator (LO) frequency at the receiver. Specifically, a sine and a cosine waveforms (known as in-phase and quadrature-phase LO) are employed to the received RF signal r(t) respectively to perform the complex down-conversion. As illustrated in FIG. 1, in-phase LO, quadrature-phase LO, and two mixers are employed to perform the complex down-conversion. Therefore, the received signal is divided into I and Q branches (representing the real and imaginary parts of the equivalent baseband signal). Each branch is then followed by amplification, channel selecting filtering, and digitization. Ideally, the sine and cosine waveforms of the down-conversion must be orthogonal, i.e., exactly a 90 phase difference at the same amplitude. Any mismatching between the processing performed on the I and Q branches after down-conversion contributes to the overall IQ imbalance in the system. The IQ imbalance significantly affects the performance of the system.

A variety of techniques have been developed in the analog domain to reduce IQ mismatching. Component mismatches are reduced by layout techniques and by increasing the physical size of the devices to benefit from the averaging over the area. Additionally, different circuit topologies have been used in analog circuit designs that provide more robust protection against component mismatches. Such techniques, however, increases device sizes and raises power consumption in the analog domain. Even accepting the power consumption penalty does not remove the mismatches completely. Any process variation in resistor or capacitor values causes them to introduce mismatches in the analog domain. Layout parasitic, dynamic fabrication, and temperature variations can limit the achievable match between the I and Q branches at high carrier frequencies.

In "Compensation schemes and performance analysis of IQ imbalances in OFDM receivers," *IEEE Trans. Signal. Proc.*, vol. 53, no. 8, pp. 3257-3268, August 2005, Tarighat et al. introduce a formulation that systematically describes the input-output relation in an OFDM system with IQ imbalances as a function of the channel taps and distortion parameters. The input-output relation is then used to motivate and derive compensation algorithms (both pre-FFT and post-FFT-based), as well as an adaptive compensation algorithm with improved convergence rate. However, Tarighat does not take into account the effect of the carrier frequency offset (CFO) which is a common impairment in OFDM receivers.

Using the same pre-FFT compensation architecture as Tarighat, United States Publication No. 2006/0029150, Capozio et al. propose an adaptive approach to estimate the phase and gain imbalance parameters in the presence of CFO. The proposed algorithm enjoys low-complexity but suffers from low convergence rate for tracking the required parameters. Exploiting the assumption that the channel response does not change substantially between successive frequency taps, Tubbax el. al. in US Patent Application Publication, no. 2005/0152482 proposed a post-FFT approach to estimate the phase and gain imbalance parameters and to correct the frequency channel responses. In US Patent Publication No. 2005/0276354, S. L. Su proposes that the repetitive attribute of the preamble in a signal received by the receiver is used to estimate the IQ imbalance parameters.

BRIEF SUMMARY OF THE INVENTION

Accordingly, a method for solving the IQ distortion in OFDM receivers by exploiting baseband and digital signal processing is desirable.

In one aspect of the invention, a method for compensating IQ imbalance is provided. First, an OFDM signal is received. The OFDM signal is then translated into frequency domain to form a translated OFDM signal, where the translated OFDM signal has N sub-carriers. An IQ imbalance compensation factor is thus generated according to the k-th sub-carrier of the translated signal, the (N−k+2)-th sub-carrier of the translated signal, and the complex conjugates thereof.

In another aspect of the invention, a method for compensating IQ imbalance is provided. First, an OFDM signal is received. The OFDM signal is then translated into frequency domain to form a translated OFDM signal, where the translated OFDM signal has N sub-carriers. An IQ imbalance compensation factor is thus generated according to a first matrix A, a conjugate transpose of the first matrix A*, and the M sub-carriers of the translated OFDM signal.

In yet another aspect of the invention, a method for compensating IQ imbalance is provided. The method comprises generating an IQ imbalance compensation factor of a n-th OFDM frame $\rho_n$ by filtering $\rho_{n-1}$, wherein $$\rho_n = \gamma \rho_{n-1} + (1-\gamma)\frac{\beta}{\alpha^*},$$

$\rho_{n-1}$ is a IQ imbalance compensation factor of the (n−1)-th frame, $\rho_n$ is a IQ imbalance compensation factor of the n-th frame, $\gamma$ is a factor which is not larger than one, and, $$\frac{\beta}{\alpha^*}$$

is an estimated IQ imbalance compensation factor of the n-th frame.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 2:
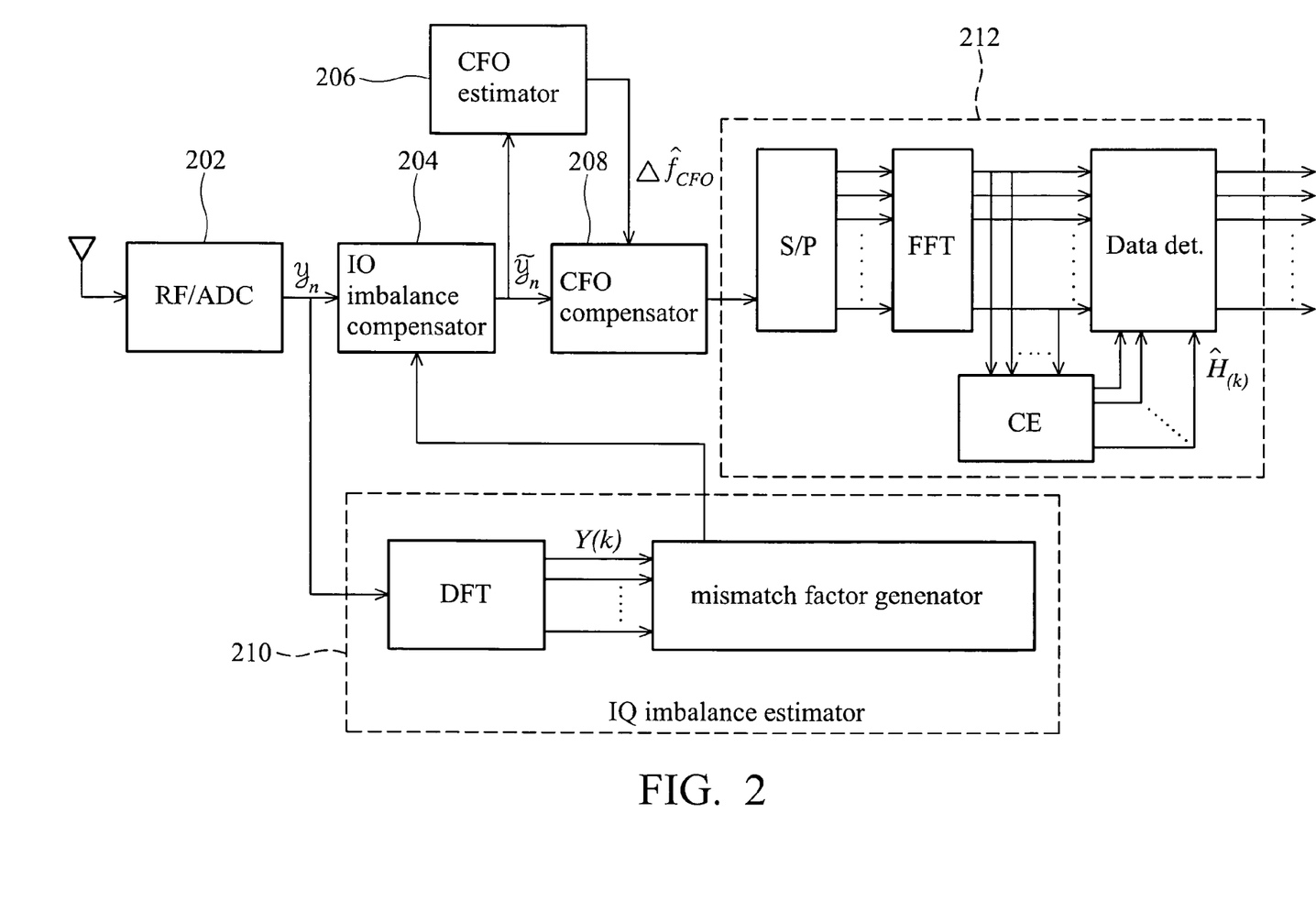
FIG. 2 shows a block diagram of an OFDM system with IQ mismatch compensation and CFO compensation.

FIG. 2 shows a block diagram of an OFDM system with IQ mismatch compensation and CFO compensation. The term "IQ mismatch" herein is equivalent to "IQ imbalance". Let b(t) represent the transmitted complex signal before being distorted by the IQ imbalance and the CFO caused by analog processing. The distorted signal in time domain can be modeled as:

$$y(t)=\alpha e^{j\Delta fCFO t}b(t)+\beta e^{-j\Delta fCFO t}b^*(t).\qquad \text{Eq. (1)}$$

The distortion parameters $\alpha$ and $\beta$ are related to amplitude and phase imbalance between I and Q branches in the RF/Analog demodulation process through a simplifying model as follows:

$$\alpha=\cos(\theta/2)+j\epsilon\sin(\theta/2)$$

$$\beta=\epsilon\cos(\theta/2)-j\sin(\theta/2) \qquad \text{Eq. (2)}$$

where $\theta$ and $\epsilon$ are, respectively, the phase and amplitude imbalance between the I and Q branches. When stated in dB, the amplitude imbalance is computed as $20\log_{10}(\epsilon)$. In the following, the parameters $\alpha$ and $\beta$ are referred to as the IQ imbalance parameters. The values of the imbalance parameters are not known at the receiver. Block 202 down-converts the RF signal into baseband, and then samples the analog signal y(t) into digital $y_n$, where:

$$y_n=\alpha e^{j\Delta fCFO n}b_n+\beta e^{-j\Delta fCFO n}b^*_n. \qquad \text{Eq. (3)}$$

The IQ mismatch estimator 210 estimates the amount of distortion to be compensated, thus, IQ compensator 204 generates a compensated signal $\tilde{y}_n$. The compensated signal $\tilde{y}_n$ can be expressed as:

$$\tilde{y}_n = y_n - \left(\frac{\beta}{\alpha^*}\right)y_n^* \qquad \text{Eq. (4)}$$

$$= \left(\alpha - \frac{|\beta|^2}{\alpha^*}\right)e^{j\Delta fCFO n}b_n$$

Obviously, the IQ distortion can be removed by using the above transformation given that the value of $$\frac{\beta}{\alpha^*}$$

is provided. The value $$\frac{\beta}{\alpha^*}$$

is regarded as the IQ imbalance compensation factor. Alternatively, a compensated signal can also be expressed as: $\tilde{y}_n$, where:

$$\tilde{y}_n = \alpha^* y_n - \beta y_n^* \qquad \text{Eq. (5)}$$

$$= (|\alpha|^2 - |\beta|^2)e^{j\Delta fCFO n}b_n.$$

CFO estimator 206 combining with CFO compensator 208 removes the CFO from compensated signal $\tilde{y}_n$. OFDM demodulator 212 proceeds the IQ mismatch and CFO compensated signal to recover $b_n$.

A signal Y(k) presented the k-th sub-carrier output of the DFT module in 210 can be expressed as:

$$Y(k)=\alpha DFT\{e^{j\Delta fCFO n}b_n\}+\beta DFT\{e^{-j\Delta fCFO n}b^*_n\}. \qquad \text{Eq. (6)}$$

Ignoring the impairment due to the CFO, Eq. (6) can be expressed as:

$$Y(k)=\alpha H(k)X(k)+\beta H^*(N-k+2)X^*(N-k+2). \qquad \text{Eq. (7)}$$

where H(k) represents the channel frequency response at the k-th sub-carrier, and X(k) represents the transmitted pilot data at the k-th sub-carrier. On the other hand, the signal Y(N-k+2) presented on the (N-k+2)-th sub-carrier can be expressed as:

$$Y(N-k+2)=\alpha H(N-k+2)X(N-k+2)+\beta H^*(k)X^*(k). \qquad \text{Eq. (8)}$$

Let $\Omega \triangleq \{k; k \in \text{pilot}\}$ and $\overline{\Omega} \triangleq \{N-k+2; k \in \text{pilot}\}$. For convince, the sub-carrier set $\overline{\Omega}$ is referred as the mirror of the sub-carrier set $\Omega$.

Figure 3:
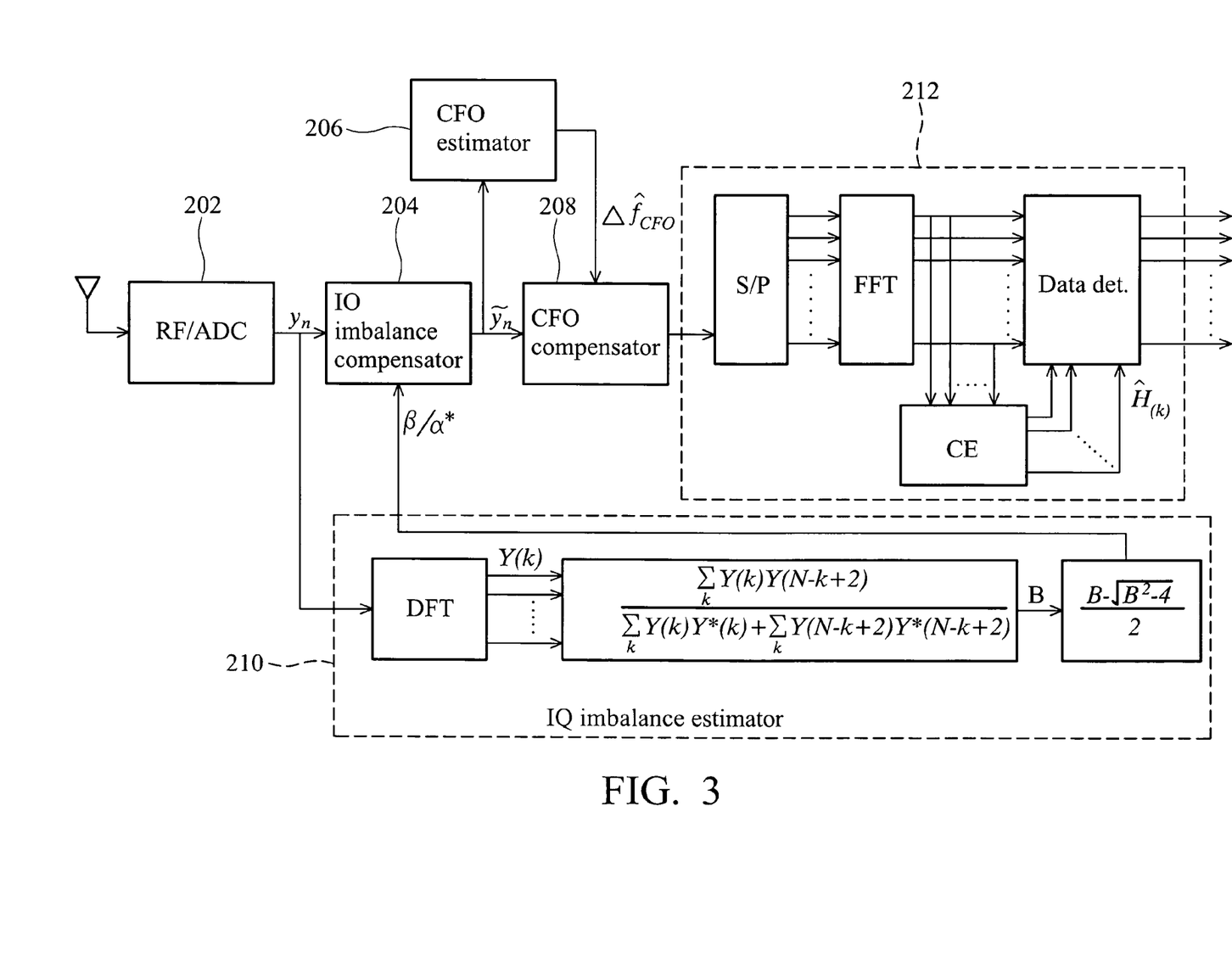
FIG. 3 shows a block diagram of IQ mismatch compensation according to one embodiment of the invention.

FIG. 3 shows an exemplary block diagram of IQ mismatch estimator 210 according to one embodiment of the invention. With Eq. (7) and Eq. (8), it is easy to prove that:

$$Y(k)Y(N-k+2)=\alpha\beta|H(k)|^2|X(k)|^2+\alpha\beta|H(N-k+1)|^2|X(N-k+1)|^2+\ldots$$

$$Y(k)Y^*(k)=\alpha\alpha^*|H(k)|^2|X(k)|^2+\beta\beta^*|H(N-k+1)|^2|X(N-k+1)|^2+\ldots$$

$$Y(N-k+2)Y^*(N-k+2)=\alpha\alpha^*|H(N-k+2)|^2|X(N-k+2)|^2+\beta\beta^*|H(k)|^2|X(k)|^2+\ldots,$$

where the notation "..." indicates less significant components in the equation. Next, dividing $$\sum_k Y(k)Y(N-k+2) \text{ by}$$

$$\sum_k Y(k)Y*(k) + \sum_k Y(N-k+2)Y*(N-k+2)$$

obtains:

$$\frac{\sum_k Y(k)Y(N-k+2)}{\sum_k Y(k)Y*(k) + \sum_k Y(N-k+2)Y*(N-k+2)} = \frac{\alpha\beta\sum_k |H(k)|^2|X(k)|^2 + |H(N-k+1)|^2 X|(N-k+1)|^2 + \ldots}{(|\alpha|^2+|\beta|^2)\sum_k |H(k)|^2 |X(k)|^2 + |H(N-k+1)|^2 |X(N-k+1)| + \ldots} \qquad \text{Eq. (9)}$$

$$\approx \frac{\alpha\beta}{|\alpha|^2+|\beta|^2}$$

$$\triangleq B.$$

Note that the summation with respect to k in Eq. (9) corresponds to some pilot indexes, i.e. k∈Ω. The summation can include either all the sub-carriers in Ω or partial sub-carriers in Ω. With Eq. (9), the IQ imbalance compensation factor $$\frac{\beta}{\alpha^*}$$

can be calculated by:

$$\frac{\beta}{\alpha^*} = \frac{B - \sqrt{B^2-4}}{2} \qquad \text{Eq. (10)}$$

Clearly, in the invention, channel information H(k) and pilot data X(k) are not required. In addition, it should be noted that, in the presence of CFO, no changes are required to perform the invention.

For a special case where: X(N−k+2)=0. ∀(N−k+2)∈$\bar{\Omega}$, $$Y(k)Y(N-k+2)=\alpha\beta|H(k)|^2|X(k)|^2+\ldots$$

$$Y(k)Y^*(k)=\alpha\alpha^*|H(k)|^2|X(k)|^2+\ldots$$

As a result, the value $$\frac{\beta}{\alpha^*}$$

can be estimated by:

$$\frac{\sum_k Y(k)Y(N-k+2)}{\sum_k Y(k)Y*(k)} = \frac{\alpha\beta\sum_k |H(k)|^2|X(k)|^2 + \ldots}{|\alpha|^2\sum_k |H(k)|^2|X(k)|^2 + \ldots} \qquad \text{Eq. (11)}$$

$$= \frac{\beta}{\alpha^*}.$$

Figure 4:
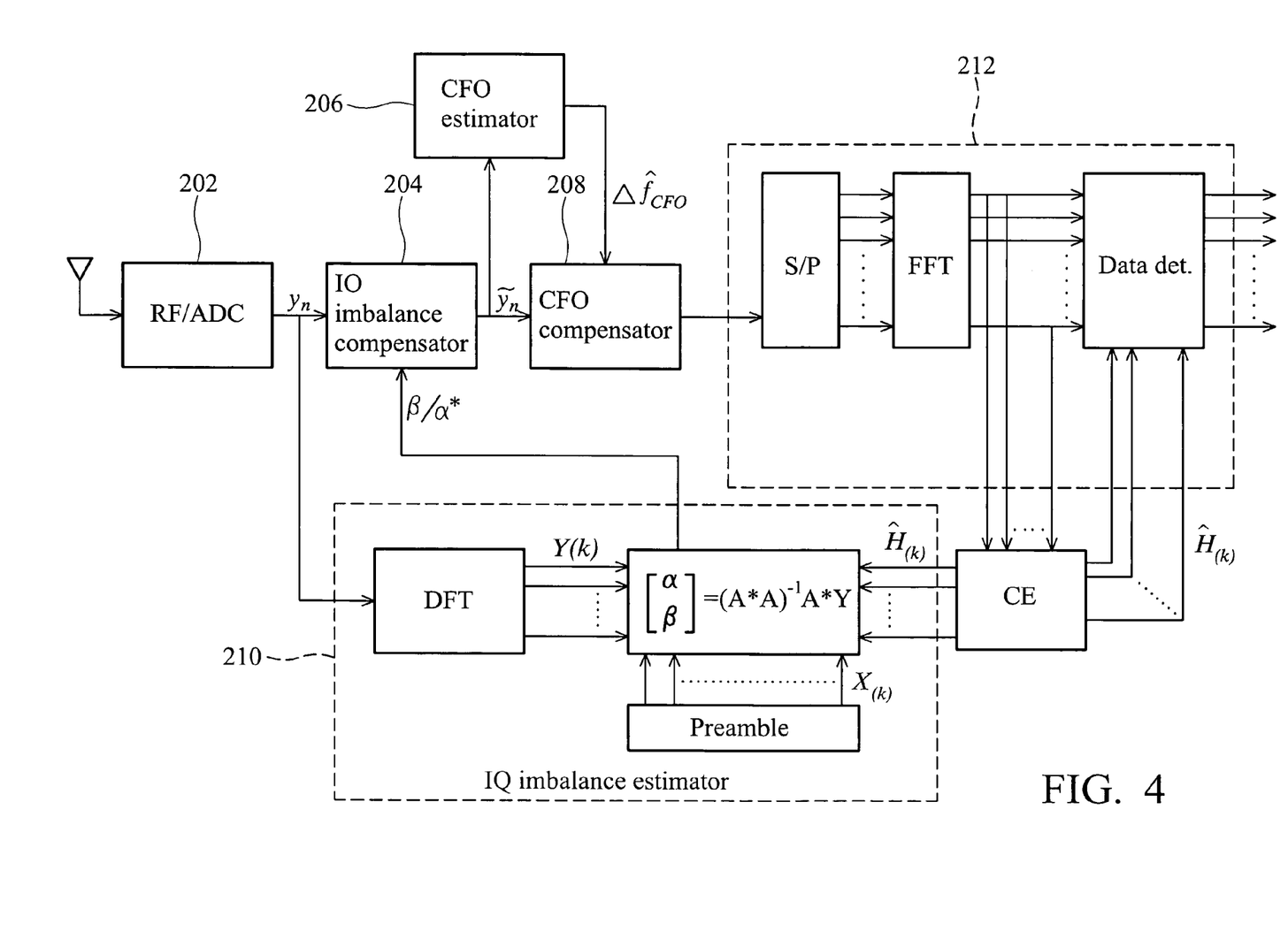
FIG. 4 shows another block diagram of the IQ mismatch compensation according to one embodiment of the invention.

FIG. 4 shows another block diagram of the IQ mismatch compensation according to one embodiment of the invention. Let Y=[ ... Y(k) ... ]$^T$ be the collection of the DFT output signals at some pilot sub-carriers in Ω. Again, the included sub-carriers can be either all the sub-carriers in Ω or partial sub-carriers in Ω. Next, let:

$$A = \begin{bmatrix} \vdots & \vdots \\ H(k)X(k) & H(N-k+2)X(N-k+2) \\ \vdots & \vdots \end{bmatrix} \qquad \text{Eq. (12)}$$

where the row values correspond to the selected pilots. With Y and A, $$\begin{bmatrix} \alpha \\ \beta \end{bmatrix}$$

can be derived from:

$$\begin{bmatrix} \alpha \\ \beta \end{bmatrix} = [A^* A]^{-1} A^* Y \qquad \text{Eq. (13)}$$

In order to obtain A, the channel information H(k) and pilot data X(k) are required. For practical systems, pilots {X(k)} which are used to estimate channel parameters are usually available and are known at the receiver. With the pilot data, the channel can also be estimated using channel estimators (CE), e.g., the MMSE CE. The estimated channel information $\hat{H}(k)$ is then applied to construct A. Consequently, the IQ parameters can be estimated by Eq. (13). In fact, to perform Eq. (13), matrix inverse is unnecessary, since only the ratio between α* and β is required and not the individual values. Let:

$$R = A^*A = \begin{bmatrix} R_{11} & R_{12} \\ R_{21} & R_{22} \end{bmatrix} \qquad \text{Eq. (14)}$$

Eq. (14) can be re-formulated as:

$$\begin{bmatrix} \tilde{\alpha} \\ \tilde{\beta} \end{bmatrix} = \begin{bmatrix} R_{22} & -R_{12} \\ -R_{21} & R_{11} \end{bmatrix} A^*Y \qquad \text{Eq. (15)}$$

As a result, the ratio between α* and β is given by:

$$\frac{\beta}{\alpha^*} = \frac{\tilde{\beta}}{\tilde{\alpha}^*} \quad \text{Eq. (16)}$$

It should be noted that, even if applying Eq. (5) to compensate the IQ imbalance, the obtained IQ parameters $\tilde{\alpha}^*$ and $\tilde{\beta}$ can be used directly.

For a special case where $X(N-k+2)=0, \forall (N-k+2) \in \overline{\Omega}$, A becomes a vector:

$$a = \begin{bmatrix} \vdots \\ H(k)X(k) \\ \vdots \end{bmatrix} \quad \text{Eq. (17)}$$

As a result, the parameter $\tilde{\alpha}$ which is proportional to α can be estimated by:

$$\tilde{\alpha} = a^* Y \quad \text{Eq. (18)}$$

Moreover, the parameter $\tilde{\beta}$ which is proportional to β can be estimated by:

$$\tilde{\beta} = a^* \overline{Y} \quad \text{Eq. (19)}$$

where $\overline{Y} = [\ldots Y(N-k+2) \ldots]^T$ is the collection of the DFT output signals corresponding to the mirror of the pilot sub-carriers. After the parameters $\tilde{\alpha}$ and $\tilde{\beta}$ are obtained, the ratio between α* and β can be calculated according to Eq. (16).

Figure 5:
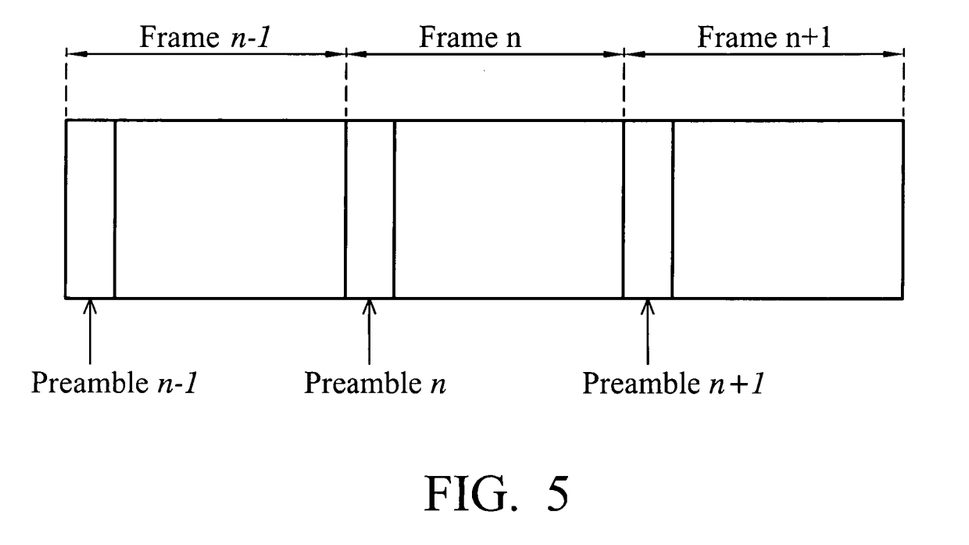
FIG. 5 shows OFDM frame structure.

The embodiments aforementioned can be performed to calculate $$\frac{\beta}{\alpha^*}$$

as long as the OFDM symbol contains pilots. Since the IQ parameters vary slowly in time, an estimated $$\frac{\beta}{\alpha^*}$$

can be represented in averaging the previous estimation $\rho_{n-1}$. That is, $$\rho_n = \gamma \rho_{n-1} + (1-\gamma) \frac{\beta}{\alpha^*} \quad \text{Eq. (20)}$$

which is the same as:

$$\rho_n = \gamma \rho_{n-1} + (1-\gamma) \frac{\tilde{\beta}}{\tilde{\alpha}^*} \quad \text{Eq. (21)}$$

where n indicates the estimation index and $\gamma \leq 1$ is the forgotten factor. $\rho_n$ can be regarded as the estimated ratio $$\frac{\beta}{\alpha^*}$$

at the n-th index and use it to compensate the IQ imbalance according to Eq. (4). For example, as shown in FIG. 5, the ratio $$\frac{\beta}{\alpha^*}$$

is estimated by the preamble (pilots in preamble) of the n-th frame. In this case, the $\rho_n$ can be evaluated according to Eq. (20). Finally, $\rho_n$ can be applied to compensate the IQ imbalance after the n-th frame according to Eq. (4).

Figure 6A:
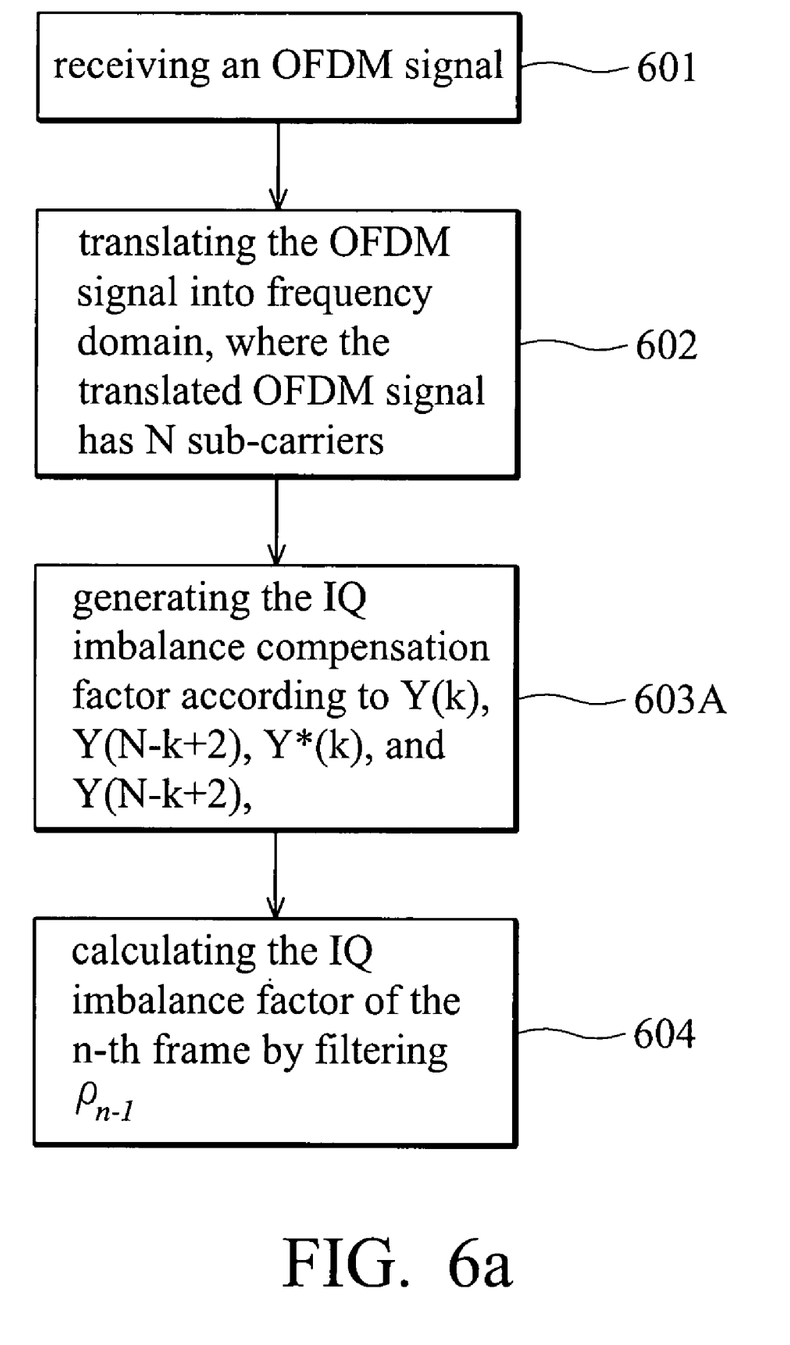
FIGS. 6a and 6b show flowcharts of a method for compensating IQ imbalance according to the invention.

FIG. 6a shows a flowchart of a method for compensating IQ imbalance according to one embodiment of the invention. In step 601, an OFDM signal y(t) is received. The OFDM signal is translated into frequency domain in step 602, wherein the translated OFDM signal has N sub-carriers Y(1)-Y(N). In step 603A, the IQ imbalance compensation factor is generated according to the k-th sub-carrier of the translated signal Y(k), the (N−k+2)-th sub-carrier of the translated signal Y(N−k+2), and the complex conjugates thereof. In step 604, an IQ imbalance compensation factor of the n-th OFDM frame $\rho_n$ can be generated by filtering $\rho_{n-1}$, wherein $$\rho_n = \gamma \rho_{n-1} + (1-\gamma) \frac{\beta}{\alpha^*}.$$

In one embodiment of the invention, the IQ imbalance compensation factor can be generated from the following formula:

$$\frac{\sum_k Y(k)Y(N-k+2)}{\sum_k Y(k)Y^*(k) + \sum_k Y(N-k+2)Y^*(N-k+2)},$$

where $Y^*(k)$ is the complex conjugate of $Y(k)$, and $Y^*(N-k+2)$ is the complex conjugate of $Y(N-k+2)$. Set $$\frac{\sum_k Y(k)Y(N-k+2)}{\sum_k Y(k)Y^*(k) + \sum_k Y(N-k+2)Y^*(N-k+2)}$$

equals to B, and the IQ imbalance compensation factor is $$\frac{B - \sqrt{B^2 - 4}}{2}.$$

Figure 6B:
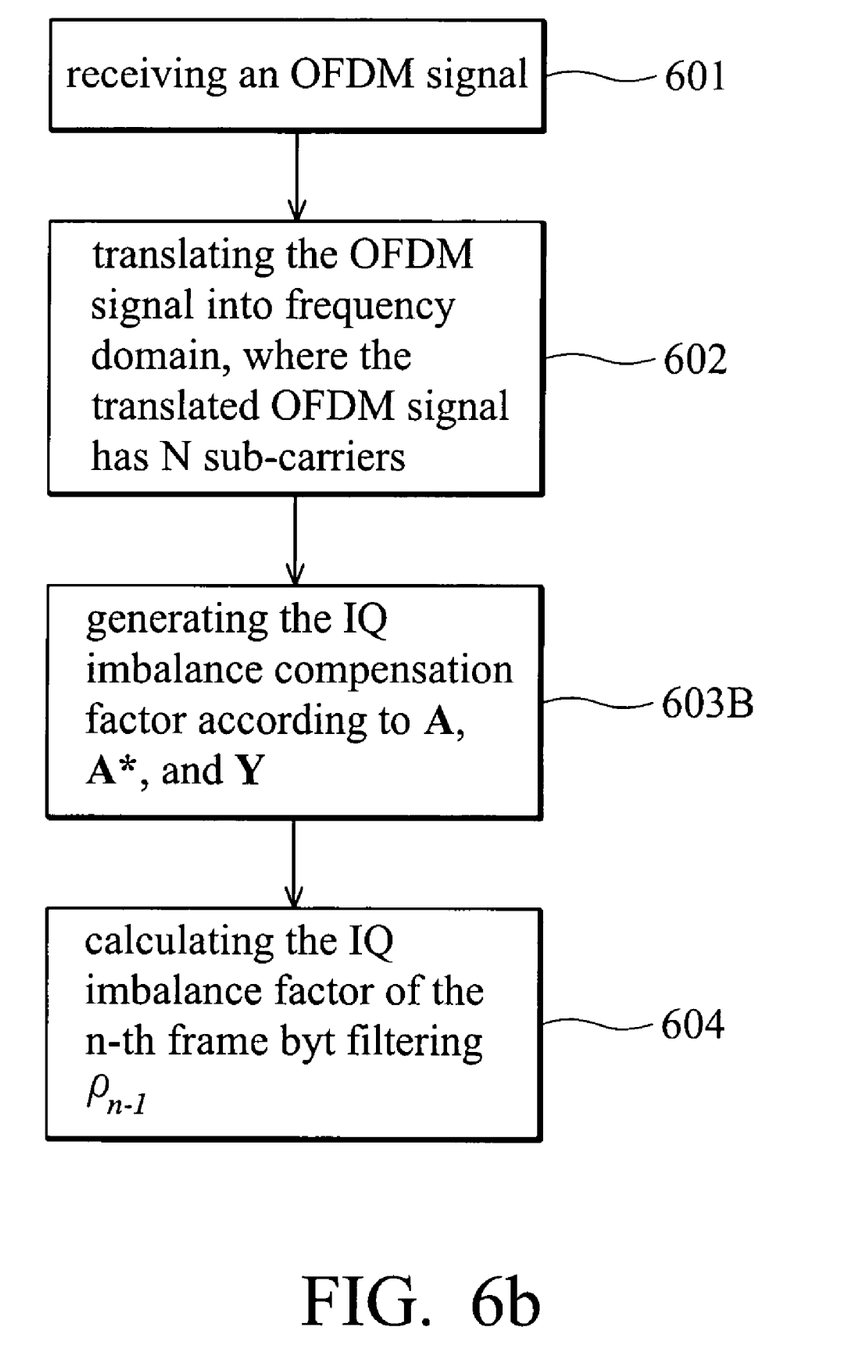

FIG. 6b shows a flowchart of a method for calculating IQ imbalance factor or IQ imbalance parameters according to another embodiment of the invention. The steps 601-602 are substantially the same with the steps in FIG. 6a. In step 603B, the IQ imbalance compensation factor is generated according to a first matrix A, a conjugate transpose of the first matrix A*, and the N sub-carriers of the translated OFDM signal.

For example, the IQ imbalance compensation factor according to $[A^*A]^{-1}AY$, where $Y=[\ldots Y(k) \ldots]^T$, and $Y(k)$ is the k-th sub-carrier of the OFDM signal. The first matrix A can be expressed as:

$$A = \begin{bmatrix} \vdots & \vdots \\ H(k)X(k) & H(N-k+2)X(N-k+2) \\ \vdots & \vdots \end{bmatrix},$$

where H(k) is the k-th sub-carrier frequency response of the transmission channel which the OFDM signal has passed through, and X(k) is the pilot at the k-th sub-carrier of the original OFDM signal. The result of $[A^*A]^{-1}AY$ can be expressed as:

$$\begin{bmatrix} \alpha \\ \beta \end{bmatrix} or \begin{bmatrix} \tilde{\alpha} \\ \tilde{\beta} \end{bmatrix}.$$

In some embodiments, with the estimated IQ parameters $\tilde{\alpha}^*$ and $\tilde{\beta}$, the IQ imbalance can be compensated by $$y_n - \left(\frac{\tilde{\beta}}{\tilde{\alpha}^*}\right) y_n^*.$$

In other embodiments, with the estimated IQ parameters $\tilde{\alpha}^*$ and $\tilde{\beta}$, the IQ imbalance can also be compensated by $\tilde{\alpha}^* y_n - \tilde{\beta} y_n^*$.

In some embodiments of the invention, the pilot X(N−k+2) is 0, then the first matrix A is simplified as $$\begin{bmatrix} \ldots \\ H(k)X(k) \\ \ldots \end{bmatrix}.$$

In some embodiments of the invention, a carrier frequency offset (CFO) can be estimated according to the imbalance compensated signal, and hence the CFO inherited in the imbalance compensated signal is reduced.

Figure 7:
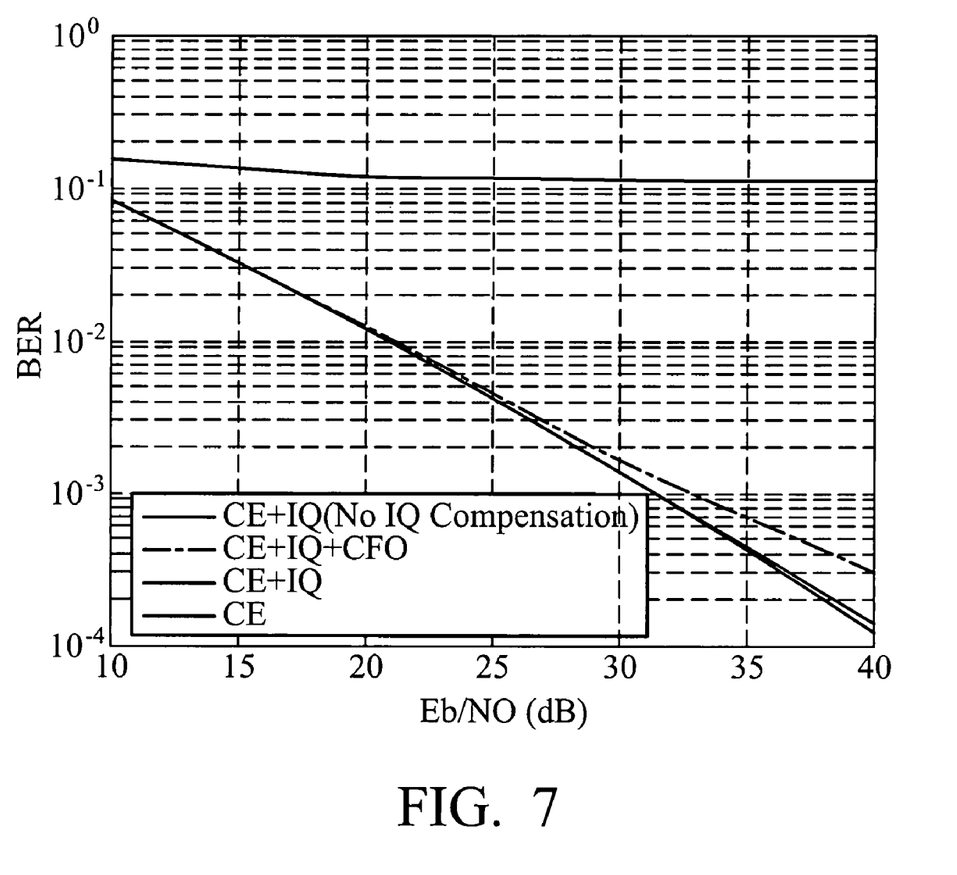
FIG. 7 shows the simulation results of IQ imbalance compensation with $\theta=8°$ and $\epsilon=0.1146$ according to one embodiment of the invention.

FIG. 7 shows simulation results of IQ imbalance compensation using Eq. (13)-(19) with θ=8° and ε=0.1146. The simulation takes at IEEE 802.16e, 64-QAM, Veh.-A channel model, and CFO as 0.4 sub-carrier spacing. As shown in FIG. 7, the compensated results have better BER then no IQ mismatch compensation.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for compensating IQ imbalance in a receiver, comprising:

receiving an OFDM signal;

translating the OFDM signal into frequency domain to form a translated OFDM signal, where the translated OFDM signal has N sub-carriers; and generating an IQ imbalance compensation factor $$\frac{\beta}{\alpha^*}$$

to an IQ imbalance compensator according to $$\frac{B - \sqrt{B^2 - 4}}{2},$$

wherein expressing $$\frac{\sum_k Y(k)Y(N-k+2)}{\sum_k Y(k)Y*(k) + \sum_k Y(N-k+2)Y*(N-k+2)}$$

as B, where Y(k) is the k-th sub-carrier of the translated signal, Y(N−k+2) is the (N−k+2)-th sub-carrier of the translated signal, Y*(k) is the complex conjugate of Y(k), and Y*(N−k+2) is the complex conjugate of Y(N−k+2).

2. The method as claimed in claim 1, wherein the OFDM signal comprises a plurality of pilot sub-carriers, and the k-th sub-carrier is a pilot sub-carrier.

3. The method as claimed in claim 2, wherein k is the sub-carrier index of the translated signal, and the union of Y(k) is either all the pilot sub-carriers of the transmitted signal or partial pilot sub-carriers of the transmitted signal.

4. The method as claimed in claim 1, wherein the OFDM signal comprises a plurality of pilot sub-carriers, and the k-th sub-carrier is a pilot sub-carrier.

5. The method as claimed in claim 4, wherein k is the sub-carrier index of the translated signal, and the union of Y(k) is either all the pilot sub-carriers of the transmitted signal or partial pilot sub-carriers of the transmitted signal.

6. The method as claimed in claim 1, further comprising:

generating an IQ imbalance compensated signal by $$y_n - \left(\frac{\beta}{\alpha^*}\right) y_n^*,$$

where $y_n$ is the received OFDM signal in time domain and $y_n^*$ is the conjugate of $y_n$.

7. The method as claimed in claim 1, wherein the OFDM comprises a plurality of pilot sub-carriers, and the method further comprises generating the IQ imbalance compensation factor $$\frac{\beta}{\alpha^*}$$

according to the formula $$\frac{\sum_k Y(k)Y(N-k+2)}{\sum_k Y(k)Y^*(k)}$$

when X(N−k+2)=0, wherein all k-th sub-carriers are pilot sub-carriers, X(N−k+2) is (N−k+2)-th transmitted sub-carrier, Y(k) is k-th sub-carrier of the translated signal, Y(N−k+2) is (N−k+2)-th sub-carrier of the translated signal.

8. The method as claimed in claim 7, further comprising: generating an IQ imbalance compensated signal by $$y_n - \left(\frac{\beta}{\alpha^*}\right)y_n^*$$

where $y_n$ is the received OFDM signal in time domain and $y^*_n$ is the conjugate of $y_n$.

9. The method as claimed in claim 6, further comprising: estimating a carrier frequency offset (CFO) according to the IQ imbalance compensated signal;
modifying the IQ imbalance compensated signal by reducing the estimated CFO which is inherited in the IQ imbalance compensated signal; and
generating a processed signal according to the modified IQ imbalance compensated signal.

10. The method as claimed in claim 8, further comprising: estimating a carrier frequency offset (CFO) according to the IQ imbalance compensated signal;
modifying the IQ imbalance compensated signal by reducing the estimated CFO which is inherited in the IQ imbalance compensated signal; and
generating a processed signal according to the modified IQ imbalance compensated signal.

11. The method as claimed in claim 1, further comprising generating Y(k) and Y(N−k+2) by carrying out a discrete Fourier transform (DFT).

12. A method for compensating IQ imbalance in a receiver, comprising:
receiving an OFDM signal, wherein the OFDM signal comprises a plurality of pilot sub-carriers, propagated alone a transmission channel;
translating the OFDM signal into frequency domain to form a translated OFDM signal, where the translated OFDM signal has N sub-carriers; and
generating an IQ imbalance compensation factor to an IQ imbalance compensator according to a first matrix A, a conjugate transpose of the first matrix A*, and M sub-carriers of the translated OFDM signal, wherein the first matrix A is $$A = \begin{bmatrix} \vdots & \vdots \\ H(k)X(k) & H(N-k+2)X(N-k+2) \\ \vdots & \vdots \end{bmatrix},$$

wherein H(k) is k-th sub-carrier frequency response of the transmission channel, H(N−k+2) is (N−k+2)-th sub-carrier frequency response of the transmission channel, X(k) is k-th transmitted pilot sub-carrier and X(N−k+2) is (N−k+2)-th transmitted sub-carrier.

13. The method as claimed in claim 12, further comprising generating the IQ imbalance compensation factor according to the following formula:
$[A^*A]^{-1}AY$, wherein $Y = [\ldots Y(k) \ldots]^T$, and Y(k) is the k-th sub-carrier of the translated OFDM signal.

14. The method as claimed in claim 13, further comprising: expressing $[A^*A]^{-1}AY$ as $$\begin{bmatrix} \alpha \\ \beta \end{bmatrix};$$

and
generating an IQ imbalance compensated signal by $$y_n - \left(\frac{\beta}{\alpha^*}\right)y_n^*$$

where $y_n$ is the received OFDM signal in time domain and $y^*_n$ is the conjugate of $y_n$.

15. The method as claimed in claim 13, further comprising: expressing $[A^*A]^{-1}AY$ as $$\begin{bmatrix} \alpha \\ \beta \end{bmatrix};$$

and
generating an IQ imbalance compensated signal by $\alpha^* y_n - \beta y^*_n$ where $y_n$ is the received OFDM signal in time domain and $y^*_n$ is the conjugate of $y_n$.

16. The method as claimed in claim 13, further comprising: expressing $$\begin{bmatrix} R_{22} & -R_{12} \\ -R_{21} & R_{11} \end{bmatrix} A*Y \text{ as } \begin{bmatrix} \tilde{\alpha} \\ \tilde{\beta} \end{bmatrix},$$

wherein $\tilde{\alpha}$ and $\tilde{\beta}$ are two values proportional to $\alpha$ and $\beta$ respectively, and $$A*A = \begin{bmatrix} R_{11} & R_{12} \\ R_{21} & R_{22} \end{bmatrix};$$

generating the IQ imbalance compensation factor by $$\frac{\tilde{\beta}}{\tilde{\alpha}^*}.$$

17. The method as claimed in claim 16, further comprising: generating an IQ imbalance compensated signal by $$y_n - \left(\frac{\tilde{\beta}}{\tilde{\alpha}^*}\right) y_n^*$$

where $y_n$ is the received OFDM signal in time domain and $y^*_n$ is the conjugate of $y_n$.

18. The method as claimed in claim 13, further comprising: expressing $$\begin{bmatrix} R_{22} & -R_{12} \\ -R_{21} & R_{11} \end{bmatrix} A * Y \text{ as } \begin{bmatrix} \tilde{\alpha} \\ \tilde{\beta} \end{bmatrix},$$

wherein $\tilde{\alpha}$ and $\tilde{\beta}$ are two values proportional to $\alpha$ and $\beta$ respectively, and $$A * A = \begin{bmatrix} R_{11} & R_{12} \\ R_{21} & R_{22} \end{bmatrix};$$

generating an IQ imbalance compensated signal by $\tilde{\alpha}^* y_n - \tilde{\beta} y^*_n$ where $y_n$ is the received OFDM signal in time domain and $y^*_n$ is the conjugate of $y_n$.

19. The method as claimed in claim 12, wherein the OFDM signal propagates along a transmission channel, when the X(N−k+2)=0 the method comprises:
generating the first matrix A by $$\begin{bmatrix} \cdots \\ H(k)X(k) \\ \cdots \end{bmatrix};$$

generating an IQ imbalance compensation parameter $\tilde{\alpha}$ according to $A^* \cdot \overline{Y}$; and
generating an IQ imbalance compensation parameter $\tilde{\beta}$ according to $A^* \cdot \overline{Y}$, wherein H(k) is k-th sub-carrier frequency response of the transmission channel, X(k) is k-th transmitted pilot sub-carrier and X(N−k+2) is (N−k+2)-th transmitted sub-carrier, Y=[ ... Y(k) ... ]$^T$, $\overline{Y}$=[ ... Y(N−k+2) ... ]$^T$, Y(k) is the k-th sub-carrier of the translated OFDM signal, and Y(N−k+2) is the (N−k+2)-th sub-carrier of the translated OFDM signal.

20. The method as claimed in claim 19, further comprising: generating an IQ imbalance compensated signal by $$y_n - \left(\frac{\tilde{\beta}}{\tilde{\alpha}^*}\right) y_n^*$$

where $y_n$ is the received OFDM signal in time domain and $y^*_n$ is the conjugate of $y_n$.

21. The method as claimed in claim 20, further comprising: estimating a carrier frequency offset (CFO) according to the IQ imbalance compensated signal; and modifying the IQ imbalance compensated signal by reducing CFO inherited in the IQ imbalance compensated signal to generate a processed signal.

22. The method as claimed in claim 19, further comprising: generating an IQ imbalance compensated signal by $\tilde{\alpha}^* y_n - \tilde{\beta} y^*_n$ where $y_n$ is the received OFDM signal in time domain and $y^*_n$ is the conjugate of $y_n$.

23. The method as claimed in claim 22, further comprising: estimating a carrier frequency offset (CFO) according to the IQ imbalance compensated signal; and modifying the IQ imbalance compensated signal by reducing CFO inherited in the IQ imbalance compensated signal to generate a processed signal.

24. The method as claimed in claim 13, further comprising generating Y(k) by carrying out a discrete Fourier transform (DFT).

25. A method for compensating IQ imbalance in a receiver, comprising:
calculating an IQ imbalance compensation factor of the n-th OFDM frame $\rho_n$ by filtering $\rho_{n-1}$, wherein $$\rho_n = \gamma \rho_{n-1} + (1-\gamma)\frac{\beta}{\alpha^*},$$

where $\rho_{n-1}$ is a IQ imbalance compensation factor of the (n−1)-th frame, $\rho_n$ is a IQ imbalance compensation factor of the n-th frame, $\gamma$ is a factor which is not larger than one, and $$\frac{\beta}{\alpha^*}$$

is an estimated IQ imbalance compensation factor of the n-th frame; and
outputting the IQ imbalance compensation factor to an IQ imbalance compensator.

26. The method as claimed in claim 1, further comprising calculating the IQ imbalance compensation factor of the n-th OFDM frame $\rho_n$ by filtering $\rho_{n-1}$, wherein $$\rho_n = \gamma \rho_{n-1} + (1-\gamma)\frac{\beta}{\alpha^*},$$

where $\rho_{n-1}$ is a IQ imbalance compensation factor of the (n−1)-th frame, where $\rho_n$ is a IQ imbalance compensation factor of the n-th frame, $\gamma$ is a factor, and $\gamma \leq 1$.

27. The method as claimed in claim 7, further comprising calculating the IQ imbalance compensation factor of the n-th OFDM frame $\rho_n$ by filtering $\rho_{n-1}$, wherein $$\rho_n = \gamma \rho_{n-1} + (1-\gamma)\frac{\beta}{\alpha^*},$$

where $\rho_{n-1}$ is a IQ imbalance compensation factor of the (n−1)-th frame, where $\rho_n$ is a IQ imbalance compensation factor of the n-th frame, $\gamma$ is a factor, and $\gamma \leq 1$.

28. The method as claimed in claim 16, further comprising: calculating the IQ imbalance compensation factor of the n-th OFDM frame $\rho_n$ by filtering $\rho_{n-1}$, wherein $$\rho_n = \gamma \rho_{n-1} + (1-\gamma)\frac{\tilde{\beta}}{\tilde{\alpha}^*},$$

where $\rho_{n-1}$ is a IQ imbalance compensation factor of the (n−1)-th frame, where $\rho_n$ is a IQ imbalance compensation factor of the n-th frame, $\gamma$ is a factor, and $\gamma \leq 1$.

29. The method as claimed in claim 19, further comprising calculating the IQ imbalance compensation factor of the n-th OFDM frame $\rho_n$ by filtering $\rho_{n-1}$, wherein $$\rho_n = \gamma \rho_{n-1} + (1-\gamma)\frac{\tilde{\beta}}{\tilde{\alpha}^*},$$

where $\rho_{n-1}$ is a IQ imbalance compensation factor of the (n−1)-th frame, where $\rho_n$ is a IQ imbalance compensation factor of the n-th frame, $\gamma$ is a factor, and $\gamma \leq 1$.

* * * * *